(12) United States Patent
Hung et al.

(10) Patent No.: US 10,864,423 B2
(45) Date of Patent: Dec. 15, 2020

(54) AUGMENTED LEARNING SYSTEM FOR TAI-CHI CHUAN WITH HEAD-MOUNTED DISPLAY

(71) Applicant: National Taiwan University, Taipei (TW)

(72) Inventors: Yi-Ping Hung, Taipei (TW);
Ping-Hsuan Han, Taipei (TW)

(73) Assignee: National Taiwan University, Taipei (TW)

( * ) Notice: Subject to any disclaimer, the term of this patent is extended or adjusted under 35 U.S.C. 154(b) by 433 days.

(21) Appl. No.: 15/805,885

(22) Filed: Nov. 7, 2017

(65) Prior Publication Data

US 2018/0126241 A1 May 10, 2018

Related U.S. Application Data

(60) Provisional application No. 62/444,869, filed on Jan. 11, 2017, provisional application No. 62/420,000, filed on Nov. 10, 2016.

(51) Int. Cl.
| | |
|---|---|
| *G09B 19/00* | (2006.01) |
| *A63B 69/00* | (2006.01) |
| *G06F 3/16* | (2006.01) |
| *G06F 3/01* | (2006.01) |

(Continued)

(52) U.S. Cl.
CPC ............ *A63B 69/004* (2013.01); *G06F 3/011* (2013.01); *G06F 3/017* (2013.01); *G06F 3/16* (2013.01); *G09B 5/02* (2013.01); *G09B 19/0038* (2013.01); *A63B 71/0622* (2013.01); *A63B 2071/0638* (2013.01); *A63B 2071/0647* (2013.01); *A63B 2071/0666* (2013.01);

(Continued)

(58) Field of Classification Search
None
See application file for complete search history.

(56) References Cited

U.S. PATENT DOCUMENTS

| | | | | |
|---|---|---|---|---|
| 2011/0270135 | A1* | 11/2011 | Dooley | G16H 50/30 600/595 |
| 2012/0143358 | A1* | 6/2012 | Adams | G06F 3/011 700/92 |
| 2014/0125698 | A1* | 5/2014 | Latta | G06F 3/011 345/633 |

OTHER PUBLICATIONS

Han et al., "Intuitive Visual Hints for Guiding Head Movement in Learning Tai-Chi Chuan with Head-Mounted Display", Jul. 2, 2017.

(Continued)

*Primary Examiner* — Bruk A Gebremichael
(74) *Attorney, Agent, or Firm* — Rabin & Berdo, P.C.

(57) ABSTRACT

Disclosed is an augmented learning system for tai-chi chuan, including a head-mounted display put on a head of a learner, and a plurality of action sensors worn on the head or a body of the learner. The action of the learner is sensed by the action sensors, which generate and wireless transfer corresponding sensing signals to the head-mounted display. Based on the sensing signals, the head-mounted display constructs and shows images of the learner as well as a virtual coach demonstrating tai-chi chuan in front of the learner. Also, virtual assistants at different positions demonstrate the same tai-chi chuan such that the learner clearly watches each detailed move of tai-chi chuan at various views. Therefore, the present invention helps the learner effectively self-examining and self-correcting every move by means of video and audio so as to overcome learning obstacles and speed up learning progress for tai-chi chuan.

4 Claims, 6 Drawing Sheets

(51) Int. Cl.
*G09B 5/02* (2006.01)
*A63B 71/06* (2006.01)

(52) U.S. Cl.
CPC ... *A63B 2220/803* (2013.01); *A63B 2220/836* (2013.01); *A63B 2225/50* (2013.01); *B64C 2201/127* (2013.01)

(56) References Cited

OTHER PUBLICATIONS

Han et al., "My Tai-Chi coaches: An Augmented-Learning Tool for Practicing Tai-Chi Chuan", Mar. 16, 2017.
Han et al., "Augmented Visualization for Practicing Tai-Chi Chuan with Drone-Enhanced Approach", Nov. 29, 2016.

* cited by examiner

AUGMENTED LEARNING SYSTEM FOR TAI-CHI CHUAN WITH HEAD-MOUNTED DISPLAY

CROSS-REFERENCE TO RELATED APPLICATION

This application claims the priority of Provisional Application No. 62/420,000, filed on Nov. 10, 2016 and Provisional Application No. 62/444,869, filed on Jan. 11, 2017, which are incorporated herewith by reference.

BACKGROUND OF THE INVENTION

1. Field of the Invention

The present invention generally relates to an augmented learning system for tai-chi chuan, and more specifically to an augmented learning system for tai-chi chuan provided with a head-mounted display put on a head of a tai-chi chuan learner and a plurality of action sensors worn on the head or a body of the learner, the head-mounted display used to show a tai-chi chuan virtual coach demonstrating tai-chi chuan in front of the learner, and a plurality of virtual assistants located at different positions to demonstrate the same tai-chi chuan, the learner able to clearly watch each detailed move of tai-chi chuan at various views, at the same time, the head-mounted display showing a corresponding virtual image of the learner through the action sensors sensing the action and pose of the learner, thereby greatly helping the learner self-examine and correct the action and pose, and effectively speeding up learning progress.

2. The Prior Arts

As well known, tai-chi chuan is helpful for health and supposed to effectively boost up circulation and metabolism of the body through continuous practice, even adjusting autonomic nervous system and endocrine system. While tai-chi chuan provides many merits for health and lots of learners are deeply involved, the learning barrier is considerably high, and it is not easy for ordinary people to achieve in short time. Even continuously practicing and hard working on tai-chi chuan, the learner still gains not much and progress is slow because of wrong pose, gesture, or step. Unfortunately, many people cease learning at a very early stage.

Traditionally, learning tai-chi chuan is performed by a group of people. Each learner has to intimate and practice the action demonstrated by the coach, and is immediately corrected by the coach, especially for the complicated actions like lifting hands, swing hands, striding, bending knees, turning around, lowering down the body. Owing to intrinsic differences among the learners like capability of intimating, memorizing, and understanding, the difference in learning progress in the whole group is often large. The coach thus fails to keep the preset progress, and part of the learners not keeping up with the coach start to retreat due to deep frustration.

One shortcoming for learning tai-chi chuan in the prior arts is that the learner dose not has a dedicated coach for consulting and accompanying in practicing tai-chi chuan any time. While some teaching means like book, video tape, or mobile device are provided to assist the learner for self-learning, these solutions are only planar text description or video information such that the learner fails to easily self-compare the action of the coach with the action of the learner, and the wrong pose or action is still not effectively or immediately corrected.

Therefore, it is greatly needed to provide a new augmented learning system for tai-chi chuan, provided with a head-mounted display put on a head of a tai-chi chuan learner and a plurality of action sensors worn on the head or a body of the learner, the head-mounted display intended to display tai-chi chuan demonstrated by the virtual coach in front of the learner, and show the virtual assistants at different locations for the learner to watch detailed actions of tai-chi chuan in different views, the action sensors sensing an action of the learner and invoking the head-mounted display to show the action of the learner, thereby effectively helping the learner self-examine and self-correct the action, speeding up learning progress, and overcoming the above problems in the prior arts.

SUMMARY OF THE INVENTION

The primary object of the present invention is to provide an augmented learning system for tai-chi chuan, which is put on a tai-chi chuan learner, and comprises a head-mounted display and a plurality of action sensors for effectively helping the learner learning tai-chi chuan by means of video and audio. The head-mounted display is put on a head of the learner, and the action sensors are worn on specific parts of a body of the learner like the head and limbs. In particular, the action sensors are intended to sense an action of the learner and sensing signals are generated and wireless transferred to the head-mounted display for further processing and displaying.

Specifically, the head-mounted display provides a function of augmented reality (AR)/mixed reality (MR), and performs a play mode to play continuous and three-dimensional tai-chi chuan learning images based on a voice command or a body gesture command (like moving or swing hands) by the learner. The tai-chi chuan learning image comprises a tai-chi chuan demonstrating image and a learning assistant image. The tai-chi chuan demonstrating image comprises at least one virtual coach and a plurality of virtual assistants located at different preset positions to demonstrate tai-chi chuan at different views. The learning assistant image is constructed according to the sensing signals from the action sensors, and intended to simulate the action of the learner.

For instance, the action sensors are on the hands, body, legs, or head of the learner for sensing the pose, move, and action of the learner to generate and wireless transfer action signals to the head-mounted display. Thus, the head-mounted display receives and processes the action signals to construct action data and generate a corresponding image of the learner. Especially, the image of the learner is shown at a specific location in the tai-chi chuan learning image.

The action sensor may comprise a smart wrist protector, knee pad, and foot pad put on the wrist, knee, and shoe of the learner, respectively, for sensing three-dimensional locations of the wrist, knee, and foot, and corresponding pose and continuous action. Also, the smart wrist protector can be replaced by a smart watch. For example, the smart watch is able to sense gesture, waving action, and motion of the wrist so as to obtain action data of the arm. The smart knee pad senses motion of the leg, and the smart foot pad senses the action of stepping, lifting feet, moving, and turning around.

Moreover, the learner is specifically located at the center of the tai-chi chuan learning image, the virtual coach is at 12-clock, and the virtual assistants are spread around the learner, or alternatively, the virtual coaches are around the learner, and the virtual assistants are around the virtual coaches. In particular, the virtual coaches are closer to the learner than the virtual assistants. The effect is that the learner easily watches and examines the same move of tai-chi chuan at different views.

The image of the virtual coaches and the virtual assistants are three-dimensional coordination information, and previously stored in a storage medium like semiconductor memory, memory card, or hard disk.

The above voice control is implemented by a voice command by the learner, such as start, pause, continue, segment, continuous, and so on, such that the head-mounted display performs the corresponding operation, and the learner actively control the play process according to actual requirement. For instance, when the learner is not familiar with the moves of tai-chi chuan at the early learning stage, it is useful to show tai-chi chuan in the segmental play mode for every move and detailed action, prompt the names of the move and detailed action, and play the description about hands, legs, and head. After a while of learning, the learner gets used to tai-chi chuan, the continuous play mode is suitable, and it is needed to focus on differences between two continuous action like turning around, closing legs, lifting feet, dragging, swaying head, and drawing circle.

In addition, the virtual coach stands on a virtual support plate like a flying pad or a piece of round floor, such that the virtual support plate is intended to show the shadow of the virtual coach for enhancing visional effect. Particularly, the footprint of the previous action or move is also shown on the virtual support plate, and helps the learner well understand the sequence of two successive moves or detailed actions.

Since the present invention employs the head-mounted display to display the virtual coach in front of the learner and the virtual assistants at the different locations, who demonstrate the same move or detailed action of tai-chi chuan at the same time, the learner can watch the virtual coach and the virtual assistants in different views, and easily self-examines and immediately corrects each action and pose. The learner may acquire happiness from learning to avoid frustration due to continuous and complicated actions like swing hands, stepping, and turning around, thereby greatly speeding up learning progress.

Another object of the present invention is to provide an augmented learning system for assisting the tai-chi chuan learner. The system generally comprises a head-mounted display and a movable photographing device, The head-mounted display is put on the head of the learner, and provides a function of augmented reality (AR)/mixed reality (MR) for displaying a virtual reality image, as well as a function of wireless receiving and transferring signal. The movable photographing device has a function of moving and wireless receiving and transferring signal, and is provided with a camera for photographing the learner to obtain a learner image. Further, the learner image is wireless transferred to the head-mounted display.

The head-mounted display is further is provided with a location and direction sensor and a wireless transmitter. The location and direction sensor senses a location and direction of the head-mounted display, and the wireless transmitter transfers the location and direction of the head-mounted display to the movable photographing device.

Additionally, the movable photographing device receives the location and direction of the head-mounted display, and performs self-adjustment to face the learner such that the camera keeps photographing a front image of the learner, which is transferred to the head-mounted display.

Moreover, the above virtual reality image comprises a virtual mirror and a plurality of virtual coaches located around the virtual mirror. The head-mounted display receives and takes the front image of the learner as a front image of a virtual learner, who is specifically shown on the virtual mirror. In particular, each of the virtual coaches stands on a virtual support plate to demonstrate tai-chi chuan for the learner to view, imitate, and learn so as to immediately correct the pose, action and move.

Also, the virtual reality image is shown by the head-mounted display based on a voice command by the learner for convenient control.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention, and together with the description, serve to explain the principles of the invention.

Figure 1:
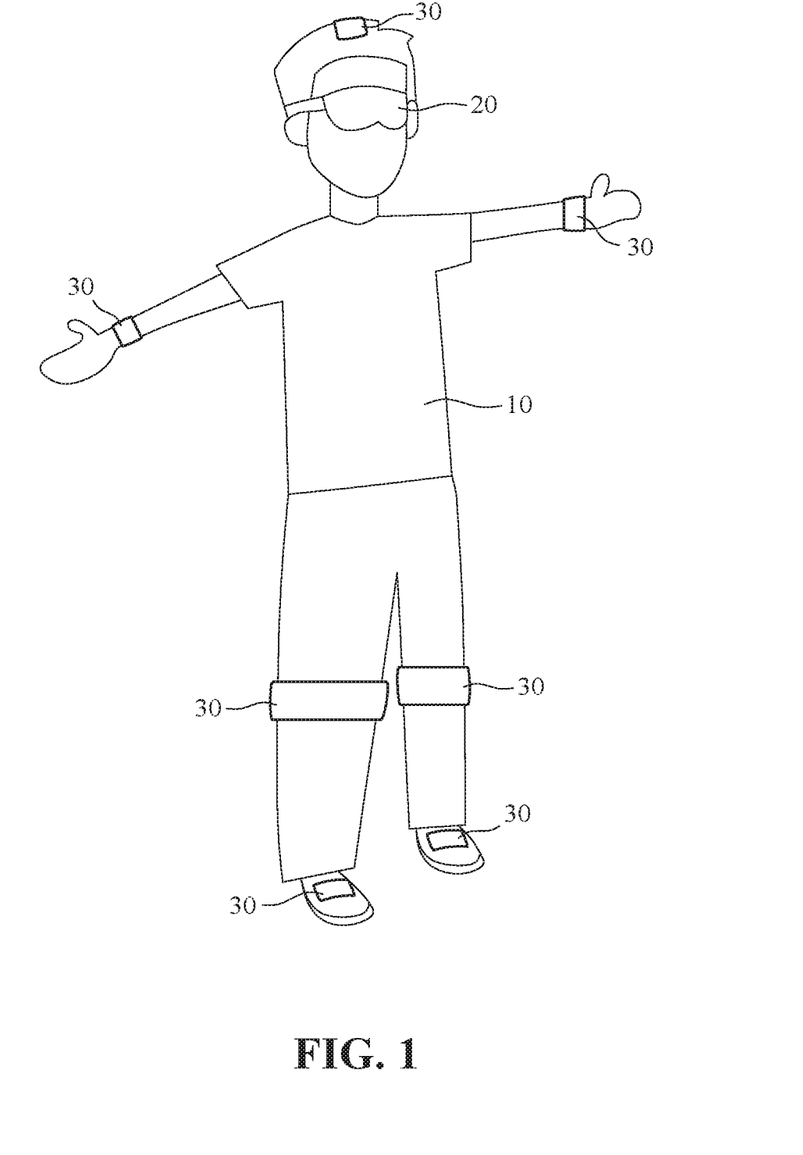
FIG. 1 is a view showing the augmented learning system for tai-chi chuan according to the first embodiment of the present invention.

Please refer to FIG. 1 illustrating the augmented learning system for tai-chi chuan according to the first embodiment of the present invention. As shown in FIG. 1, the augmented learning system for tai-chi chuan of the first embodiment is put on a tai-chi chuan learner 10, and generally comprises a head-mounted display 20 and a plurality of action sensors 30. The head-mounted display 20 is put on the head of the learner 10, and provides a function of wireless receiving signal, displaying image, and playing sound, and the action sensors 30 are worn on specific parts of the body of the learner 10 like the head and limbs, for sensing an action of the learner 10, and generating and wireless transferring sensing signals. The head-mounted display 20 receives and processes the sensing signals to obtain and show the pose and action of the learner 10 as well as helpful information for learning tai-chi chuan.

Specifically, the head-mounted display 20 provides a function of augmented reality (AR)/mixed reality (MR), and performs a play mode to play continuous and three-dimensional tai-chi chuan learning images based on a voice command by the learner 10.

Figure 2:
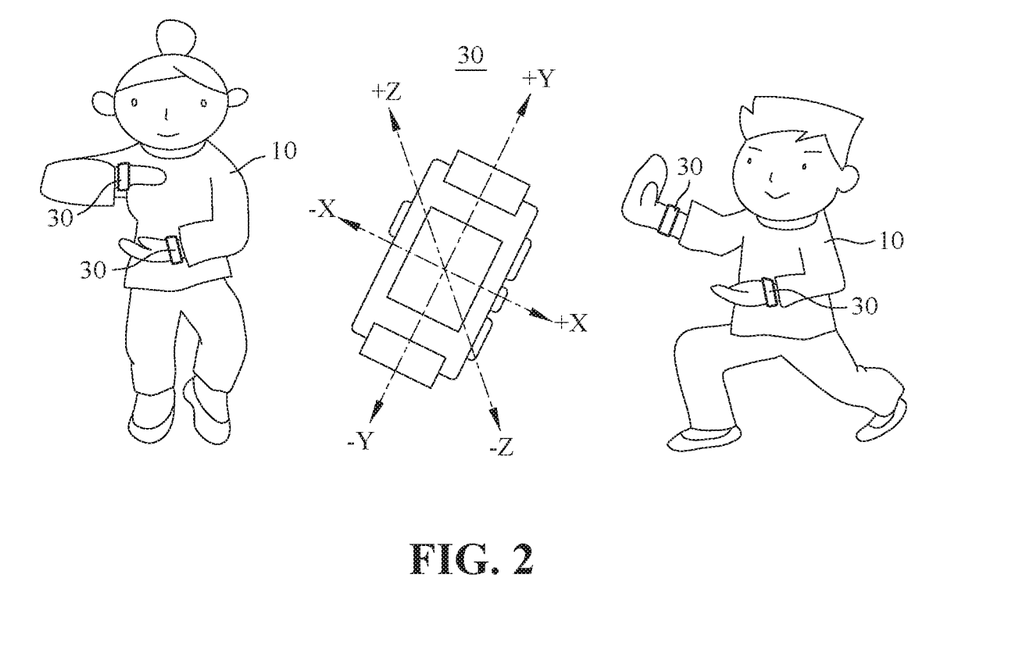
FIG. 2 is a view showing one illustrative example of the augmented learning system according to the first embodiment.
Figure 3:
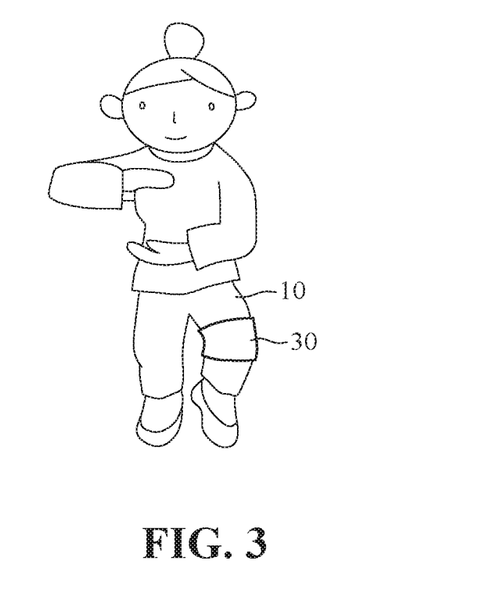
FIG. 3 is a view showing another illustrative example of the augmented learning system according to the first embodiment.

Refer to FIGS. 2 and 3 for illustrating two typical examples for the action sensors 30 of the present invention. The action sensors 30 (like smart watches) in FIG. 2 are worn on the wrists of the learner 10 for sensing the action gesture and the motion data of the wrists in the three-dimensional space so as to acquire action and pose of the hands and the arms, and the action sensors 30 in FIG. 3 are worn on the knees of the learner 10 for sensing a bending angle of the knee and a leg pose. Further, the action sensor 30 put on the head of the learner 10 is configured to sense a head swaying angle of the learner 10, and the action sensor 30 attached to the bottom of a shoe worn by the learner 10 is configured to sense a gravity center and a step data of the learner 10.

Figure 4:
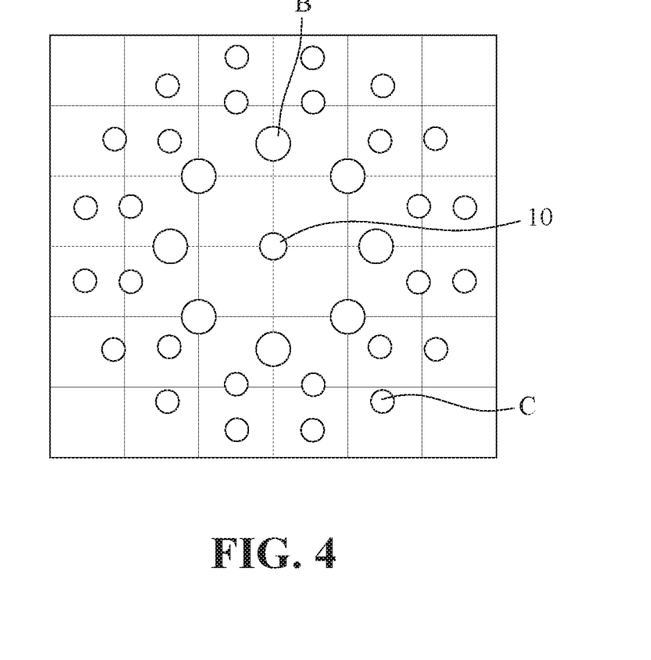
FIG. 4 is a view showing the virtual coach and the virtual assistants specifically located with respect to the learner according to the first embodiment.
Figure 5:
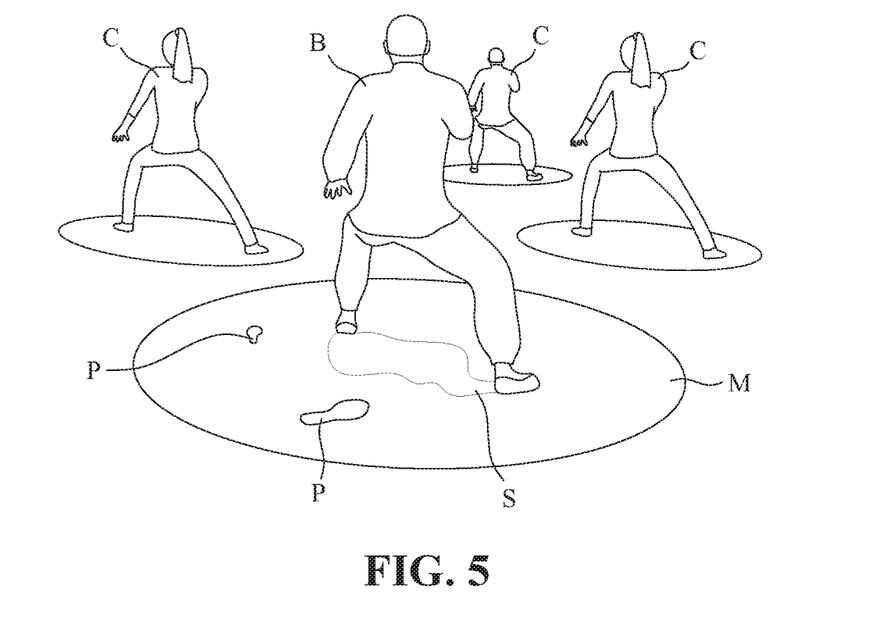
FIG. 5 is a view showing one illustrative image displayed by the head-mounted display according to the first embodiment.

Further refer to FIGS. 4 and 5 for showing the arrangement of the virtual coach and virtual assistants with respect to the learner, and one illustrative example of the tai-chi chuan learning image displayed by the head-mounted display 20, respectively. As shown by FIGS. 4 and 5, the tai-chi chuan learning image displayed by the head-mounted display 20 comprises a tai-chi chuan demonstrating image, which comprises at least one virtual coach B and a plurality of virtual assistants C at different preset locations in the tai-chi chuan learning image. Thus, each of the at least one virtual coach B and the virtual assistant C simultaneously demonstrates the same move of tai-chi chuan at different views, and every move contains a plurality of detailed actions.

Moreover, each of the virtual coach B and the virtual assistants C is specifically configured to stand on a corresponding virtual support plate M like a flying pad or a piece of round floor beneath the virtual coach B and the virtual assistants C, and the shadow S of the virtual coach is further shown on the virtual support plate M to enhance visional effect for the learner 10. In particular, the virtual support plate M may illustrate the footprint P or step of the virtual coach B for the previous action or move of tai-chi chuan to help the leaner 10 well understand the sequence of two successive actions or moves, feel smoothness, and get deep impression.

For example, one virtual coach B is located in front of the learner 10, and the virtual assistants C are around the learner 10, particularly, the virtual coach B closer to the learner 10 than the virtual assistants C. The effect provided by the virtual assistants C is to show tai-chi chuan for the learner 10 at the different views, and build up a group atmosphere for exercising tai-chi chuan so as to enhance sense of reality, avoid boring, and increase happiness of learning.

Alternatively, the at least one virtual coach B is arranged around the learner and specifically in a first approximate circle, the virtual assistants C are in at least one second approximate circle, and the first approximate circle is closer to the learner 10 than the at least one second approximate circle. In other words, the virtual coach B and the virtual assistants C are located in concentric circles with respect to the learner 10, and particularly, the virtual coach B is closer to the learner 10 than and the virtual assistants C. The shadow S of the virtual coach B and the footprint P of the previous action or move in FIG. 5 are shown to enhance visional effect and speed up learning progress for the learner 10.

Figure 6:
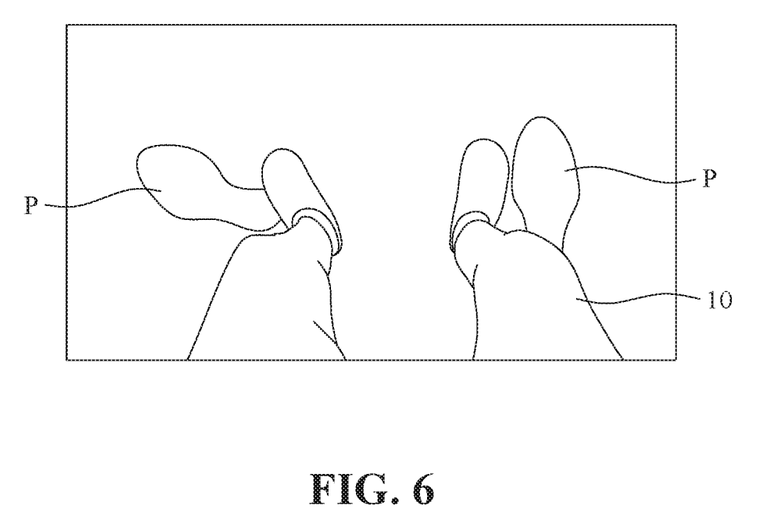
FIG. 6 is a view showing another illustrative image displayed by the head-mounted display according to the first embodiment.
Figure 7:
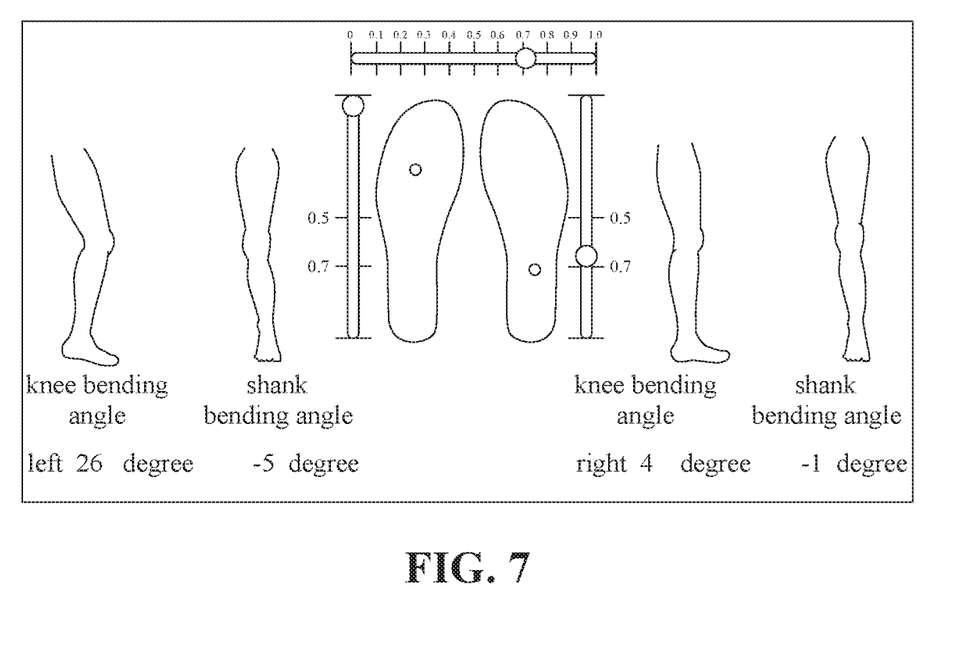
FIG. 7 is a view showing a yet illustrative image displayed by the head-mounted display according to the first embodiment.

In addition, the tai-chi chuan learning image displayed by the head-mounted display 20 further comprises a learning assistant image, as shown in FIGS. 6 and 7. The sensing signals from the action sensors 30 are used to construct the learning assistant image for the action of the learner 10, and the learning assistant image is compared with the action of the virtual coach B to generate and display an assistant information for the corresponding move or action related to the learner and the virtual coach B. Specifically, FIG. 6 illustrates the virtual leg image of the learner 10 and the footprint P of the virtual coach B as the step data for the learner 10 to refer to and compare with, and FIG. 7 shows the bending angle of the knee, the leg pose, and the gravity center of the learner 10, and the bending angle of the knee, the leg pose, and the gravity center of the virtual coach B such that the learner 10 easily corrects the pose and action. In particular, the learning assistant image may further show the related quantitative digital data (or number) for the pose and position like the bending angle and the gravity center.

Thus, the above learning assistant image comprises the head swaying angle, the bending angle of the knee, the leg pose, the action gesture, the motion data of the wrist, the gravity center, and the step data of the learner 10 and the virtual coach.

Furthermore, the play mode of the head-mounted display 20 comprises a continuous play mode and a segmental play mode. The continuous play mode displays every move of tai-chi chuan, and plays the name of the displayed move by means of voice, but does not display the detailed action of the move. In the segmental play mode, all the detailed actions of the move are displayed, and the name of the displayed move and the description for every detailed action are played by means of voice.

Further, the above voice command comprises: continuous" for starting or switching to the continuous play mode; "segment" for starting or switching to the segmental play mode; "go" or "play" for displaying the tai-chi chuan learning image; "pause" for stopping displaying the tai-chi chuan learning image; "freeze" for freezing the location of the virtual coach, moving toward the virtual coach to closely watch the action of the virtual coach, and displaying the resultant image; "reset" for rotating a facing direction of the virtual coach to the same facing direction of the learner after the voice command of freeze, and displaying the resultant image; "restart" for returning a first move of the tai-chi chuan learning image, and displaying the resultant image; "last" for returning to a previous, and displaying the resultant image; "next" for switching to a next move, and displaying the resultant image; "last move" for returning to a first frame of the previous move, and pausing; "next move" for switching a first frame of the next move, and pausing; "last action" for switching to a first frame of a previous detailed action move under the segmental play mode, and pausing; "next action" for switching to a first frame of a next detailed action move under the segmental play mode, and pausing; and "close" for terminating the play mode, and returning to a preset state after power on.

Therefore, the aspect of the first embodiment of the present invention is to provide the head-mounted display to display the image of the virtual coach demonstrating tai-chi chuan in front of the learner, and at the same time, shows the virtual assistants at the different locations demonstrating the same action of tai-chi chuan. Since the learner can watch the action of tai-chi chuan demonstrated by the virtual coach and the virtual assistants in various views, it is easily to self-examine and immediately correct the action of the learner. Thus, happiness of learning is gained and frustration avoided. In particular, the complicated actions like swing hands, stepping, and turning around become easy for the learner, and learning progress for tai-chi chuan is greatly increased.

Figure 8:
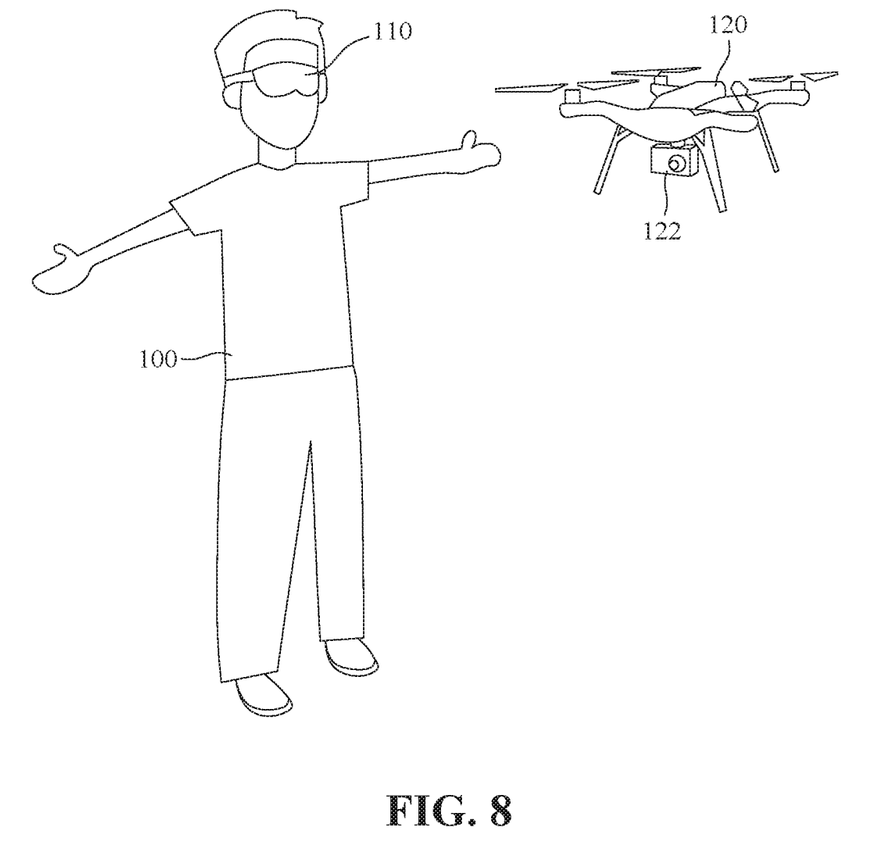
FIG. 8 is a view showing the augmented learning system for tai-chi chuan according to the second embodiment of the present invention.

Further refer to FIG. 8 for illustrating the augmented learning system for tai-chi chuan according to the second embodiment of the present invention. As shown in FIG. 8, the augmented learning system of the second embodiment is intended to assist a tai-chi chuan learner 100, and comprises a head-mounted display 110 and a movable photographing device 120. The head-mounted display 110 is similar to the head-mounted display 20 of the first embodiment, and has the function of augmented reality (AR)/mixed reality (MR) for displaying a virtual reality image, Also, the head-mounted display 110 has a function of wireless receiving and transferring signal. The movable photographing device 120 is provided with a camera 122 for photographing the learner 100 to acquire the image of the learner 100. Further, the movable photographing device 120 wireless transfers the image of the learner 100 to, the head-mounted display 110.

In particular, the head-mounted display 110 is further provided with a location and direction sensor and a wireless transmitter. The location and direction sensor senses a location and direction of the head-mounted display, and the wireless transmitter transfers the location and direction of the head-mounted display 110 to the movable photographing device 120. Thus, the movable photographing device 120 acquires the location and direction of the head-mounted display 110, that is, the location and direction of the learner 100. For example, the movable photographing device 120 can be implemented by a drone or a robot with features like moving, photographing, and wireless control.

More specifically, the movable photographing device 120 is specifically configured to keep facing or in front of the learner 100 with a specific elevation angle. For instance, the movable photographing device 120 is about 5 meters away from the learner 100, and the elevation angle is 0, 30, or 45 degree. Since the movable photographing device 120 is able to acquire the location and direction of the learner 100, the camera 122 can lock the learner 100 and continuously photograph the front image of the learner 100.

Figure 9:
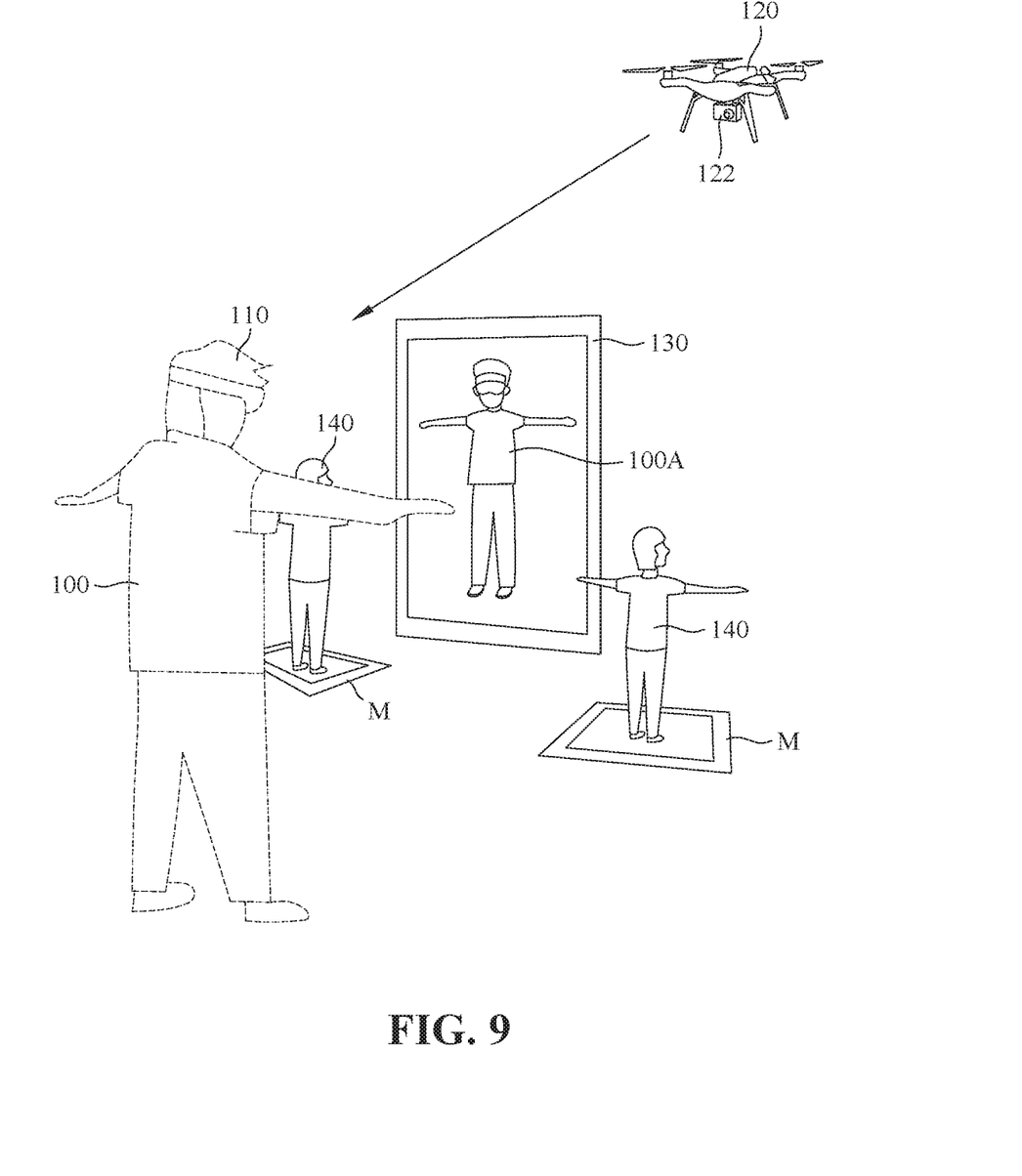
FIG. 9 is a view showing one illustrative example of the second embodiment.

Also refer to FIG. 9 illustrating one illustrative example of the second embodiment. As shown in FIG. 9, the head-mounted display 110 in the example of the second embodiment of the present invention is put on the head of the learner 100 for generating the virtual reality image, like the image in FIG. 9 saw by the learner 100. To more clearly illustrates and emphasizes the differences between the real object of the learner 100 and the content of the virtual reality image displayed by the movable photographing device 120, the dashed-line figures are intended for the real objects, and the solid-line figures are for the virtual reality image.

Further, the virtual reality image comprises a specific virtual mirror 130 and a plurality of virtual coaches 140, and the virtual coaches 140 are located around the virtual mirror 130, such as the left and right sides of the virtual mirror 130. Also, the head-mounted display 110 displays a virtual learner 100A on the virtual mirror 130 according to the received the image of the learner 100 from the movable photographing device 120. That is, the learner can see the virtual learner 100A who faces the learner 100.

Additionally, each of the virtual coaches 140 stands on a virtual support plate M like a flying pad or a piece of round floor for the learner 100 to conveniently recognizing the virtual coaches 140. Also, the virtual support plate M may shows the shadow (not shown) of the virtual coaches 140 to further enhance sense of reality for stronger visional effect. In the virtual reality image displayed by the head-mounted display 110, the virtual coaches 140 demonstrate tai-chi chuan for the learner 100 to view. Thus, the learner 100 simultaneously watches the image of the learner 100 (the virtual learner 100A in the virtual mirror 130) and the images of the virtual coaches 140 for reference, intimating, learning, and immediately correcting the pose, gesture, and action.

Moreover, the virtual reality image is shown by the head-mounted display 110 according to the voice command by the learner 100. For instance, the voice command comprises: continuous" for starting or switching to the continuous play mode; "segment" for starting or switching to the segmental play mode; "go" or "play" for displaying the tai-chi chuan learning image; "pause" for stopping displaying the tai-chi chuan learning image; "freeze" for freezing the location of the virtual coach, moving toward the virtual coach to closely watch the action of the virtual coach, and displaying the resultant image; "reset" for rotating a facing direction of the virtual coach to the same facing direction of the learner after the voice command of freeze, and displaying the resultant image; "restart" for returning a first move of the tai-chi chuan learning image, and displaying the resultant image; "last" for returning to a previous, and displaying the resultant image; "next" for switching to a next move, and displaying the resultant image; "last move" for returning to a first frame of the previous move, and pausing; "next move" for switching a first frame of the next move, and pausing; "last action" for switching to a first frame of a previous detailed action move under the segmental play mode, and pausing; "next action" for switching to a first frame of a next detailed action move under the segmental play mode, and pausing; and "close" for terminating the play mode, and returning to a preset state after power on.

Therefore, the aspect of the second embodiment is that the virtual reality image is constructed and displayed by the head-mounted display, and comprises the virtual mirror and the virtual coaches, and the movable photographing device always locks and continuously photographs the learner, and wireless transfers the image of the learner to the head-mounted display. Then, the head-mounted display takes the image of the learner as the corresponding image of the virtual learner, and shows the virtual learner, on the virtual mirror. Also, the virtual coaches are located around the virtual mirror and demonstrate tai-chi chuan such that the learner simultaneously watches the action of the virtual coaches and the learner for easily and immediately correcting the pose and action, and learning efficiency is greatly improved.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An augmented learning system for tai-chi chuan for assisting a tai-chi chuan learner, comprising:
    a head-mounted display configured to be put on a head of the learner, and configured to provide a function of augmented reality (AR)/mixed reality (MR) and display a virtual reality image, and having a function of wirelessly receiving and transferring a signal; and a movable photographing device having a function of moving and wirelessly receiving and transferring a signal, and provided with a camera for photographing the learner to obtain a learner image, the learner image being wirelessly transferred to the head-mounted display, wherein the head-mounted display is provided with a location and direction sensor and a wireless transmitter, the location and direction sensor senses a location and direction of the head-mounted display, the wireless transmitter transfers the location and direction of the head-mounted display to the movable photographing device, the movable photographing device receives the location and direction of the head-mounted display, and performs self-adjustment to face the learner, the camera keeps photographing a front image of the learner, the movable photographing device transfers the front image of the learner to the head-mounted display, the virtual reality image comprises a virtual mirror, a plurality of virtual coaches, and a plurality of virtual assistants, the virtual coaches and the virtual assistants are around the virtual mirror, the head-mounted display takes the front image of the learner as a front image of a virtual learner, the front image of the virtual learner is shown on the virtual mirror, and each of the virtual coaches and the virtual assistants stands on a virtual support plate to demonstrate tai-chi chuan for the learner to view and learn.

2. The augmented learning system for tai-chi chuan as claimed in claim 1, wherein the movable photographing device is implemented by a drone or a robot provided with a function of moving, photographing, and remote control.

3. The augmented learning system for tai-chi chuan as claimed in claim 1, wherein the head-mounted display shows the virtual reality image based on a voice command or a body gesture command by the learner.

4. The augmented learning system for tai-chi chuan as claimed in claim 3, wherein the voice command comprises:

"continuous" for starting or switching to the continuous play mode;

"segment" for starting or switching to the segmental play mode;

"go" or "play" for displaying the tai-chi chuan learning image;

"pause" for stopping displaying the tai-chi chuan learning image;

"freeze" for freezing the location of the virtual coach, moving toward the virtual coach to closely watch the action of the virtual coach, and displaying the resultant image;

"reset" for rotating a facing direction of the virtual coach to the same facing direction of the learner after the voice command of freeze, and displaying the resultant image;

"restart" for returning a first move of the tai-chi chuan learning image, and displaying the resultant image;

"last" for returning to a previous, and displaying the resultant image;

"next" for switching to a next move, and displaying the resultant image;

"last move" for returning to a first frame of the previous move, and pausing;

"next move" for switching a first frame of the next move, and pausing;

"last action" for switching to a first frame of a previous detailed action move under the segmental play mode, and pausing;

"next action" for switching to a first frame of a next detailed action move under the segmental play mode, and pausing; and "close" for terminating the play mode, and returning to a preset state after power on.

* * * * *